Patented June 15, 1937

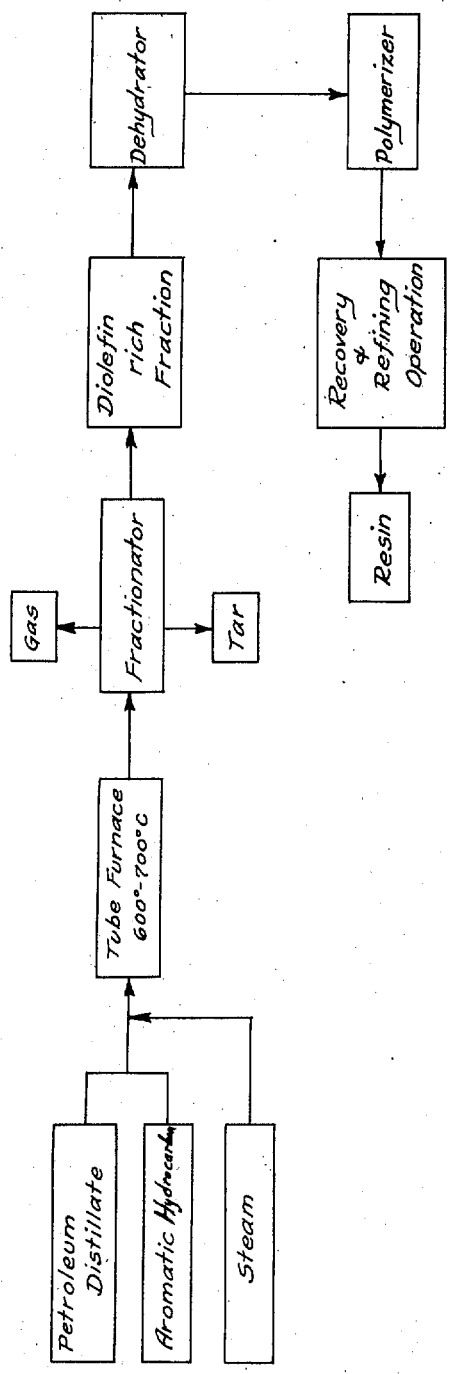

2,084,012

UNITED STATES PATENT OFFICE 2,084,012

PYROLYSIS OF HYDROCARBONS FOR RESIN MANUFACTURE

Charles A. Thomas, Dayton, Ohio

Continuation of application Serial No. 702,796, December 16, 1933. This application May 6, 1935, Serial No. 19,979

9 Claims. (Cl. 196—50)

This invention relates to the manufacture of resins which are essentially petroleum hydrocarbon polymers and it pertains particularly to the pyrolysis of petroleum hydrocarbons to form distillates which, by reason of the conditions of pyrolysis, yield upon polymerization polymers in good quantity and of excellent quality for the manufacture of varnishes. Various methods for converting the distillates to polymers by means of Friedel-Crafts type catalysts may be employed including, for example, those described in the patent of Charles A. Thomas and Carroll A. Hochwalt, No. 1,836,629 of December 15, 1931; patent of Charles A. Thomas, No. 1,947,626 of August 12, 1933; patent of Charles A. Thomas, No. 1,939,932 of December 19, 1933; patent of Charles A. Thomas, No. 1,982,707 of December 4, 1934; patent of Charles A. Thomas and William H. Carmody, No. 1,982,708, of December 4, 1934.

The present application is a continuation of my copending application Serial Number 702,796, filed December 16, 1933.

The principal object of this invention is to provide a method of producing cracked petroleum distillates containing hydrocarbons in good yields which are especially suitable for conversion to polymers of high molecular weight, having film forming properties particularly when combined with drying oils and analogous hydroxy glycerides such as castor oil.

Another object of this invention is to provide a method of making hydrocarbon resins characterized by increased melting point and the property of reacting with drying oils and hydroxy fatty acid glycerides.

Other objects and advantages of this invention will be apparent from the following description and the appended claims.

This invention consists essentially of a process of pyrolyzing a substantially paraffin hydrocarbon stock together with a small addition of an aromatic hydrocarbon fraction in such a manner that the resulting condensate contains hydrocarbons in good yields which are especially suitable for polymerization to form hydrocarbon resins.

The accompanying drawing is a flow sheet illustrative of the method of conducting the process of the invention. This flow sheet will be comprehended more thoroughly when considered in conjunction with the description which follows.

In practicing this invention gaseous or liquid petroleum fractions, such as stabilizer fractions, butane, gas, oil or kerosene, together with an aromatic hydrocarbon, for example, a coal tar fraction or a cracked petroleum fraction containing aromatic hydrocarbons, are passed through a tube cracking furnace at temperatures ranging from about 600° C. to 1000° C. Steam may be used to prevent obstruction of the tube by deposited carbon. The products consist of gas and a liquid condensate containing some tar and other materials which are not particularly suitable for use in producing resins according to the method described in the patents to which reference has been made. The usuable condensate is recovered from the liquid condensate preferably by vacuum fractional distillation with superheated steam, although simple distillation or distillation in vacuo can be satisfactorily employed. By the vaccum distillation with superheated steam, fractions with boiling points up to about 280° C. at atmospheric pressure are recovered. The fractions boiling up to about 210° C. at atmospheric pressure are most valuable as raw materials for resin formation. The hydrocarbon fraction is then separated from the water which came over during the distillation, and subsequently dried. This fraction is converted to the desired resin polymer by known methods as for example, surface catalysts such as active clay at elevated temperatures, or preferably at ordinary temperatures and in the presence of metallic halide catalysts such as aluminum chloride.

According to a preferred procedure the recovered dried fraction is agitated with a small quantity of anhydrous metallic halide for a period sufficient to convert the resin-forming substances contained therein into resins. This time is usually about one-half to five hours. After this period the mixture is made slightly alkaline, preferably with an alcoholic ammonia solution, and the precipitated solids are removed. From the filtrate the unreacted hydrocarbons are recovered by distillation. The resin remains as the residue.

It has been found that the addition of aromatic hydrocarbons to the substantially saturated hydrocarbon charging stock produces a condensate much more suitable for resin production. The yield of condensate suitable for resin manufacture is increased by the addition of aromatic hydrocarbons to the charging stock. The resins produced therefrom are characterized by higher melting points, are less fluorescent, and have varnish characteristics superior to those produced from condensates made without addition of aromatic hydrocarbons to the charging stock. Resins of higher melting points are more desirable since the films deposited from varnishes made therefrom are harder and the resins themselves are easier to handle and market than those of low melting points which have a tendency to flow together. These superior varnish characteristics are manifested in the property possessed by the resin of reacting or combining with drying oils when heated therewith. Films deposited from varnishes made from, for example, a combination of the resins with castor oil and tung oil, are much more flexible, durable and adhering than those made from resins which do not thus combine. The varnishes made from such drying oil-resin combination have more body.

The varnish composition may be made advantageously by following the procedure set forth in my copending applications Serial No. 518,132, filed February 25, 1931, and issued as Patent No. 2,039,365; Serial No. 494,692, filed November 10, 1930, and subsequently divided and issued as Patents Nos. 2,023,495 and 2,039,367; and Serial No. 470,535, filed July 24, 1930, and issued as Patent No. 2,039,364.

The following comparative examples illustrate the advantages accruing from the practice of this invention:

A stock consisting of 90 parts by volume of commercial kerosene and 10 parts by volume of an aromatic hydrocarbon mixture consisting of 50 parts by volume of benzene, 30 parts of toluene and 20 parts of xylenes, is charged at the rate of 0.53 gallon per hour through a 12.5 feet nichrome V tube, having an internal diameter of one-quarter inch, heated at 875° C. Nichrome alloys have been found particularly suitable for this pyrolytic operation, although it is to be understood that the pyrolysis may be conducted in contact with other materials of construction even though their effectiveness from a mechanical standpoint under the extreme conditions of pyrolysis may leave something to be desired. Steam is added in small quantities (usually one per cent by volume or less) continuously to prevent obstruction of the tube by deposited carbon. The issuing gases are condensed and the condensate which collects amounts to 59% by weight of the charged stock whereas the uncondensed gas amounts to 41% by weight of the charged stock. The off gas has a volume composition corresponding to 0.1% carbon dioxide, 1.8% carbon monoxide, 18.4% hydrogen, 30.9% methane, 34.4% ethylene, 3.9% ethane, 0.2% acetylene, 7.3% propylene, 1.6% butanes and butylenes and 1.4% pentanes and higher hydrocarbons. Of the liquid condensate, 30% by weight is tar having a boiling point above approximately 300° C., 6.5% are heavy oils unsuited for conversion to resin and boiling about 260° C., and the remainder, boiling below about 260° C., is condensate suitable for conversion to resin. The use of steam in the recovery by distillation of the desired fraction is useful to retard premature polymerization and gum formation.

The condensate suitable for resin making has approximately the following characteristics: below 100° C., 48% by weight; from 100° C. to 115° C., 16.8%; 115° C. to 154° C., 16.8%, 154° C. to 260° C., 18.4% by weight. It is rich in diolefines and tends to deposit gum on standing. To 1000 cc. of the dried distilled condensate are added fifteen grams of anhydrous aluminum chloride in small portions with agitation. The mixture is maintained at about room temperature by cooling and is agitated for one hour, after which time 60 cc. of an alcoholic solution of ammonia prepared by mixing 60 parts by volume of 95% alcohol with 40 parts by volume of ammonium hydroxide of specific gravity 0.90. The precipitated aluminum hydroxide and ammonium chloride are removed by filtration. On evaporation of the filtrate to dryness, 175 grams of light amber colored resin are obtained. The resin has a melting point of 145° C. and its varnish characteristics are especially good. The resin obtained in this manner is particularly useful due to its property of entering into combination with the high molecular weight hydroxy fatty acid glycerides as, for example castor oil, to produce gums and resins which are soluble in petroleum solvents and form durable and tough protective films or coatings. When 10 parts by weight of this resin are heated for five minutes at 600° F. with 6 parts of castor oil and 3 parts of tung oil, the product yields a resinous composition that is tough, hard, clear and non-tacky.

The condensate usable for conversion to resin which results from repetition of the experiment in exactly the same manner but using kerosene without the addition of the aromatic hydrocarbon mixture as the charging stock, amounts to only 34.5% by weight of the charging stock. The resin obtained has a melting point of 98° C. and its varnish characteristics are distinctly inferior as compared to those of the previous example, that is, the product resulting from heating the resin for the same period at the same temperature with the same proportions of castor oil and tung oil is soft and tacky.

Pyrolysis in the same apparatus with the same aromatic charging stock at 850° C. at a rate of flow of 0.62 gallon per hour gives a smaller amount of condensate. The resin produced from this condensate is equally as satisfactory as that prepared at higher pyrolysis temperatures. At 800° C. in the same apparatus, the rate of flow of the same charging stock must be decreased to obtain condensate satisfactory for resin production.

Thus, by suitable changes in rates of flow of the charging stock, wide ranges of temperature can be employed to produce satisfactory resin forming condensates.

Although the examples outlined contain preferred embodiments of the invention it is to be understood that the invention is not to be limited to the use of any particular petroleum hydrocarbon raw material or aromatic fraction, any particular pyrolysis temperatures or conditions, tube cracking units or apparatus, any particular fraction for polymerization, or any use made of the resin.

I claim:

1. In the manufacture of hydrocarbon polymers involving the cracking of a volatilized petroleum hydrocarbon charging stock at 600°–1000° C. for the production of a distillate rich in diolefine hydrocarbons that undergo polymerization and gum formation readily, which distillate is polymerized in the presence of a Friedel-Crafts type catalyst under controlled conditions to form commercially valuable resins, the improvement characterized in that the petroleum hydrocarbon charging stock contains an aromatic hydrocarbon and is pyrolyzed in vapor phase.

2. In the manufacture of hydrocarbon polymers involving the cracking of a volatilized petroleum hydrocarbon charging stock at 600°–100° C. for the production of a distillate rich in diolefine hydrocarbons that undergo polymerization and gum formation readily, which distillate is polymerized in the presence of a Friedel-Crafts type catalyst under controlled conditions to form commercially valuable resins, the improvement characterized in that the petroleum hydrocarbon charging stock contains an aromatic hydrocarbon, and subsequently subjecting said charging stock to pyrolysis in the vapor phase, the amount of aromatic hydrocarbon contained in said charging stock being relatively small as compared to the total hydrocarbon content.

3. The method as defined in claim 1 and further characterized in that the petroleum hydrocarbon charging stock is of the boiling range of kerosene.

4. The method as defined in claim 1 and further characterized in that the petroleum hydrocarbon charging stock is of the boiling range of kerosene and the aromatic hydrocarbon contained therein is a mono nuclear aromatic.

5. The method as defined in claim 1 and further characterized in that the pyrolysis is conducted in contact with nichrome surfaces.

6. The method as defined in claim 1 and further characterized in that the pyrolized product is polymerized in the presence of aluminum chloride.

7. The method as defined in claim 1 and further characterized in that the pyrolized product is fractionated to separate tars and hydrocarbons boiling above approximately 260° C., and the resulting substantially tar free distillate is then subjected to polymerization.

8. A method as defined in claim 1 and further characterized in that the pyrolyzed product is first fractionated to separate tars and the resulting substantially tar free liquid hydrocarbon fraction is then subjected to polymerization in the presence of the catalyst, after which the catalyst in the resulting liquid mixture is decomposed to form inert products before the resin is recovered from the liquid.

9. The method as defined in claim 1 and further characterized in that the pyrolyzed product is distilled to separate the tars, the distillation being effected with the aid of steam to minimize premature polymerization after which the resulting substantially tar free diolefine containing distillate is dried and subsequently subjected to polymerization under the influence of the Friedel-Crafts catalyst thereby forming in solution a resin, which resin is subsequently recovered by first decomposing the catalyst to form inert products and subsequently recovering the resin from its solution by volatilization of the solvent.

CHARLES A. THOMAS.

CERTIFICATE OF CORRECTION.

Patent No. 2,084,012.   June 15, 1937.

CHARLES A. THOMAS.

It is hereby certified that error appears in the printed specification of the above numbered patent requiring correction as follows: Page 2, second column, line 73, claim 2, for "600°-100°" read 600°-1000°; and that the said Letters Patent should be read with this correction therein that the same may conform to the record of the case in the Patent Office.

Signed and sealed this 7th day of December, A. D. 1937.

(Seal)

Henry Van Arsdale,
Acting Commissioner of Patents.

gum formation readily, which distillate is polymerized in the presence of a Friedel-Crafts type catalyst under controlled conditions to form commercially valuable resins, the improvement characterized in that the petroleum hydrocarbon charging stock contains an aromatic hydrocarbon, and subsequently subjecting said charging stock to pyrolysis in the vapor phase, the amount of aromatic hydrocarbon contained in said charging stock being relatively small as compared to the total hydrocarbon content.

3. The method as defined in claim 1 and further characterized in that the petroleum hydrocarbon charging stock is of the boiling range of kerosene.

4. The method as defined in claim 1 and further characterized in that the petroleum hydrocarbon charging stock is of the boiling range of kerosene and the aromatic hydrocarbon contained therein is a mono nuclear aromatic.

5. The method as defined in claim 1 and further characterized in that the pyrolysis is conducted in contact with nichrome surfaces.

6. The method as defined in claim 1 and further characterized in that the pyrolized product is polymerized in the presence of aluminum chloride.

7. The method as defined in claim 1 and further characterized in that the pyrolized product is fractionated to separate tars and hydrocarbons boiling above approximately 260° C., and the resulting substantially tar free distillate is then subjected to polymerization.

8. A method as defined in claim 1 and further characterized in that the pyrolyzed product is first fractionated to separate tars and the resulting substantially tar free liquid hydrocarbon fraction is then subjected to polymerization in the presence of the catalyst, after which the catalyst in the resulting liquid mixture is decomposed to form inert products before the resin is recovered from the liquid.

9. The method as defined in claim 1 and further characterized in that the pyrolyzed product is distilled to separate the tars, the distillation being effected with the aid of steam to minimize premature polymerization after which the resulting substantially tar free diolefine containing distillate is dried and subsequently subjected to polymerization under the influence of the Friedel-Crafts catalyst thereby forming in solution a resin, which resin is subsequently recovered by first decomposing the catalyst to form inert products and subsequently recovering the resin from its solution by volatilization of the solvent.

CHARLES A. THOMAS.

CERTIFICATE OF CORRECTION.

Patent No. 2,084,012.  June 15, 1937.

CHARLES A. THOMAS.

It is hereby certified that error appears in the printed specification of the above numbered patent requiring correction as follows: Page 2, second column, line 73, claim 2, for "600°-100°" read 600°-1000°; and that the said Letters Patent should be read with this correction therein that the same may conform to the record of the case in the Patent Office.

Signed and sealed this 7th day of December, A. D. 1937.

(Seal)

Henry Van Arsdale,
Acting Commissioner of Patents.

CERTIFICATE OF CORRECTION.

Patent No. 2,084,012. June 15, 1937.

CHARLES A. THOMAS.

It is hereby certified that error appears in the printed specification of the above numbered patent requiring correction as follows: Page 2, second column, line 73, claim 2, for "600°-100°" read 600°-1000°; and that the said Letters Patent should be read with this correction therein that the same may conform to the record of the case in the Patent Office.

Signed and sealed this 7th day of December, A. D. 1937.

(Seal)

Henry Van Arsdale,
Acting Commissioner of Patents.